United States Patent [19]

Asada et al.

[11] Patent Number: 4,680,381

[45] Date of Patent: Jul. 14, 1987

[54] PROCESS FOR ISOLATING POLYMER

[75] Inventors: Masahiro Asada; Miyuki Azuma, both of Kobe, Japan

[73] Assignee: Kanegafuchi Kagaku Kogyo Kabushiki Kaisha, Osaka, Japan

[21] Appl. No.: 776,100

[22] Filed: Sep. 16, 1985

Related U.S. Application Data

[63] Continuation of Ser. No. 697,692, Feb. 4, 1985, abandoned, which is a continuation of Ser. No. 435,245, Oct. 19, 1982, abandoned.

[30] Foreign Application Priority Data

Oct. 20, 1981 [JP] Japan ............................ 56-168039

[51] Int. Cl.$^4$ ............................................. C08F 6/00
[52] U.S. Cl. .................................... 528/501; 528/491
[58] Field of Search ...................... 528/501, 491, 480

[56] References Cited

U.S. PATENT DOCUMENTS

| 3,635,928 | 1/1972 | Thomas | 528/501 |
| 4,031,056 | 6/1977 | Patel et al. | 528/501 |
| 4,115,316 | 9/1978 | Burke, Jr. | 528/501 |

OTHER PUBLICATIONS

Derwent Abstract Accession No. 71-801918/50, Belgium Patent No. 768467.

Primary Examiner—Amelia B. Yarbrough
Attorney, Agent, or Firm—Armstrong, Nikaido, Marmelstein & Kubovcik

[57] ABSTRACT

A process for isolating or recovering a polymer in the form of particles or powder from a solution thereof which comprises admixing a solution of the polymer in a substantially water-immiscible organic solvent with an aqueous solution of a water-soluble polymeric dispersing agent, and distilling away the organic solvent from the mixture in the form of a dispersion.

17 Claims, No Drawings

PROCESS FOR ISOLATING POLYMER

This application is a continuation of application Ser. No. 697,692, filed Feb. 4, 1985, which is a continuation application of Ser. No. 435,245, filed Oct. 19, 1982, both abandoned.

BACKGROUND OF THE INVENTION

The present invention relates to a process for isolating a polymer from a solution thereof, and more particularly to a process for isolating a polymer in the form of particle or powder by dispersing an organic solvent solution of a polymer in an aqueous solution of a water-soluble polymeric dispersant and distilling away the organic solvent.

Various processes for isolating or recovering a polymer from a solution thereof are known. For instance, for the isolation of aromatic polyester resins, there are proposed a process in which the resin is precipitated by adding a non-solvent such as methanol, ethanol or acetone to the solution, as disclosed in Japanese Examined Patent Publication (Tokkyo Kokoku) No. 5599/1962, No. 18399/1962, No. 1959/1964 and No. 14474/1967, a process in which an organic solvent solution of the resin is brought into contact with hot water or steam to distil away the solvent with steam, thus obtaining the resin in the form of a slurry in water, as disclosed in Japanese Examined Patent Publication No. 9445/1960 and No. 9446/1963, and a process in which an organic solvent is distilled away with heating under reduced pressure from the organic solvent solution of the resin, as disclosed in Japanese Examined Patent Publication No. 20746/1963. However, these processes have the disadvantages. The first process is uneconomical because of requiring a large amount of the non-solvent in general. The second stripping process is disadvantageous in that the bulk density of the isolated polymer is very small and, therefore, not only this results in poor economy in the subsequent washing and drying procedures, but also the pelletization of the resin is attended with difficulties. The last process by distillation is not practicable on an industrial scale, since the recovered resin becomes viscous gummy mass with increasing concentrations of the treated solution and it sticks to the wall of a vessel to result in lowering of the heat conductivity. In order to eliminate the disadvantages of these processes, it is also proposed to pulverize a gelled organic solvent solution of a polyester having a relatively high polymer concentration in Japanese Examined Patent Publication No. 41248/1980. This process is not always an industrially advantageous process, since special equipments such as a thin film evaporator and a kneader are necessary and a large power is required.

It is an object of the present invention to provide a process for isolating a polymer from an organic solvent solution thereof by a simple procedure.

A further object of the invention is to provide a process for separating a polymer from an organic solvent in a uniform particle or powder form having a high bulk density.

These and other objects of the present invention will become apparent from the description hereinafter.

SUMMARY OF THE INVENTION

In accordance with the present invention, there is provided a process for isolating a polymer which comprises the steps of admixing an 1 to 80% by weight solution of a polymer in an organic solvent which is substantially immiscible with water, with 50 to 10,000 parts of a 0.001 to 1% by weight aqueous solution of a water-soluble polymeric dispersant, and distilling away said organic solvent from the mixture in the form of a dispersion, said parts being parts by weight per 100 parts of the organic solvent solution.

DETAILED DESCRIPTION

Known water-soluble polymeric dispersants can be all used in the present invention. Preferable examples of the water-soluble polymeric dispersant are, for instance, carboxymethyl cellulose, hydroxyethyl cellulose, styrene-maleic acid copolymer and derivatives thereof, polyvinyl alcohol and derivatives thereof, polyvinyl pyrrolidone, polyvinyl pyridine-N-oxide, polyalkylene oxides and derivatives thereof, sodium alginate and derivatives thereof, lignin sulfonate, and the like. They are employed alone or in admixture thereof. A styrene-maleic acid copolymer and its derivatives, polyvinyl alcohol and its derivatives, and polyvinyl pyrrolidone are particularly preferred in that particles having a large particle size are not formed.

More preferably, a specific polyvinyl alcohol is employed as a water-soluble polymeric dispersant. Especially, it is used in combination with a polyalkylene oxide, because a foaming phenomenon during distillation of an organic solvent is prevented and the isolation is attained in a shortened period of time, and in addition, sticking of scale to an agitator is remarkably decreased. The polyvinyl alcohol preferably employed in the invention are those having a degree of hydrolysis of 60 to 100% by mole and showing a viscosity of 10 to 100 cP (4% aqueous solution at 20° C.), especially those having a degree of hydrolysis of 70 to 100% by mole and showing a viscosity of 18 to 70 cP. When the degree of hydrolysis is lower than the above range, polyvinyl alcohol is slightly soluble in water and, therefore, it is difficult to use and also polyvinyl alcohol is easy to remain in the isolated polymer and exerts a bad influence on the physical properties of moldings of the isolated polymer. Also, though it is possible to isolate particulate polymer by using polyvinyl alcohol showing a viscosity of lower than 10 cP, foaming phenomenon is easy to occur during distillation and it is difficult to stably conduct the isolation. In that case, it is necessary to control the rate of distilling away the solvent and it takes a long time for isolating the polymer. It is considered that the foaming is connected with the stability of oil droplets formed in an early stage of the process. On the other hand, polyvinyl alcohol showing a viscosity of more than 100 cP is also usable, but it is hard to use due to poor solubility in water.

The aqueous solution of a water-soluble polymeric dispersant is employed in a concentration of 0.001 to 1% by weight, preferably 0.005 to 0.5% by weight. The aqueous solution is usable in concentrations over 1% by weight, but it is not desirable because an organic solvent to be distilled away may foam. The aqueous solution of a water-soluble polymeric dispersant is employed in an amount of 50 to 10,000 parts by weight per 100 parts by weight of an organic solvent solution of a polymer to be isolated.

The use of a water-soluble polymeric dispersant such as polyvinyl alcohol in combination with a polyalkylene oxide is advantageous in that the foaming phenomenon observed during distillation completely disappears and the isolation can be very stably conducted. The polyalkylene oxide used as an additional additive for the above purpose includes polyethylene oxide, polypropylene oxide and ethylene oxide-propylene oxide compolymer, and polyethylene oxide is particularly preferred. An average molecular weight of the polyalkylene oxide is selected from 150,000 to 4,800,000. The amount of the polyalkylene oxide is selected from 0.001 to 1% by weight of water used in the isolation. The polyalkylene oxide may be added to the system in the form of a powder or an aqueous solution having a suitable concentration either at the time of starting the distillation of an organic solvent or at the point of time when the foaming is observed. The use of a combination of a polyalkylene oxide and other water-soluble polymeric dispersant largely decreases the sticking of a scale to the wall of a vessel and an agitator, and accordingly contributes to the stabilization of the process with shortening of the isolation time based on the prevention of foaming.

The process of the present invention is applicable to various polymers such as an aromatic or aliphatic polyester of the formula: $+O-CO-A-CO-O-B)_{\overline{m}}$, a polycarbonate of the formula: $+O-CO-B)_{\overline{m}}$, a polyestercarbonate of the formula: $+O-CO-A-CO-O-B)_{\overline{m}}(O-CO-O-B)_{\overline{m}}$ or $+O-CO-A-O-CO-O-B)_{\overline{m}}$, a polyamide of the formula: $+NH-CO-A-CO-NH-B)_{\overline{m}}$, a polyamidester of the formula: $+NH-CO-A-CO-NH-B)_{\overline{m}}(O-CO-A-CO-O-B)_{\overline{m}}$ or $+NH-CO-A-CO-O-B)_{\overline{m}}$, a polyesterether of the formula: $+O-D-CO-O-B)_{\overline{n}}$ or $+O-D-CO)_{\overline{n}}$, polysulfonate of the formula: $+O-SO_2-A-SO_2-O-B)_{\overline{n}}$, a polyphosphonate of the formula: $+O-PO_2-A-PO_2-O-B)_{\overline{n}}$, a polyphosphate of the formula: $+O-P(OR^1)O-A-P(OR^2)O-O-B)_{\overline{n}}$, a plyaryl sulfone of the formula: $+Ar-SO_2)_{\overline{n}}$, a polyarylene sulfide of the formula: $+Ar-S)_{\overline{n}}$, a polyarylene oxide of the formula: $+Ar-O)_{\overline{n}}$, a polyacetal of the formula:

and a vinyl polymer of the formula:

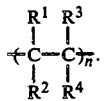

In the above general formulas, A to D are a bivalent aromatic or aliphatic group, Ar is a bivalent aromatic group, and $R^1$ to $R^4$ are a monovalent aliphatic or aromatic group, a halogen atom or hydrogen atom. The process of the invention is applicable to, among the above exemplified polymers, those soluble in organic solvents which are substantially immiscible with water.

In case that a solution to be treated contains two or more kinds of polymers, the isolated polymer is a blend thereof. Especially, in case that one of these polymers is an aromatic polyester, an aromatic polycarbonate or an aromatic polyestercarbonate, the process of the invention is very useful not only as an isolation method, but also as an industrially practicable process, since the synthesized polymer which is obtained in the form of a solution in a water-immiscible organic solvent such as methylene chloride, are easily blended with other polymers by dissolving other polymers in the solution and subjecting the solution to the process of the present invention. Therefore, the process of the present invention is also useful as a process for blending polymers.

The process of the invention is preferably applied to aromatic polyester resins, especially aromatic polyester resins of the general formula:

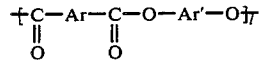

wherein Ar and Ar' are a bivalent aromatic group, more especially aromatic polyester resins of the above general formula in which Ar and Ar' are a bivalent aromatic group of the general formula:

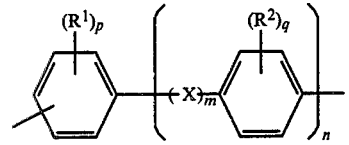

wherein m and n are 0 or an integer of 1 to 2, p and q are 0 or an integer of 1 to 4, $R^1$ and $R^2$ are a $C_1$ to $C_{20}$ alkyl, aryl, aralkyl, alkoxyl, aryloxy or arylalkoxyl group, a substituted derivative thereof or a halogen atom, and X is a covalent bond, a $C_1$ to $C_{10}$ alkylene group, a $C_5$ to $C_{15}$ cycloalkylene group, a cycloalkylidene group or its derivative, $-O-$, $-S-$, $-CO-$, or $-SO_2-$, provided that the substituent groups on the benzene rings can be the same or different and different groups from each other can be attached to different positions on the respective benzene rings.

Aromatic dicarboxylic acid components of the aromatic polyester include, for instance, terephthalic acid, isophthalic acid, phthalic acid, diphenyl ether dicarboxylic acid, 4,4'-diphenyl dicarboxylic acid, 4,4'-diphenylmethane dicarboxylic acid, and 2,2-bis(4-carboxyphenyl)propane. Bisphenol components of the aromatic polyester include, for instance, bis(4-hydxoryphenyl)methane, bis(4-hydroxy-3-methylphenyl)methane, bis(4-hydroxy-3,5-dimethylphenyl)methane, bis(4-hydroxy-3,5-dichlorophenyl)methane, bis(4-hydroxy-3,5-dibromo)methane, bis(4-hydroxy-3,5-difluorophenyl)methane, bis(4-hydroxy-3,5-diphenylphenyl)methane, bis(4-hydroxyphenyl)-ketone, bis(4-hydroxyphenyl)sulfide, bis(4-hydroxyphenyl)sulfone, 4,4'-dihydroxydiphenyl ether, 1,1-bis(4-hydroxyphenyl)ethane, 2,2-bis(4-hydroxyphenyl)propane, 2,2-bis(4-hydroxy-3-methylphenyl)propane, 2,2-bis(4-hydroxy-3,5-dimethylphenyl)propane, 2,2-bis(4-hydroxy-3,5-diphenylphenyl)propane, 2,2-bis(4-hydroxy-3,5-dichlorophenyl)propane, bis(4-hydroxyphenyl)phenylmethane, bis(4-hydroxyphenyl)diphenylmethane, bis(4-hydroxyphenyl)-4'-methylphenylmethane, 1,1-bis(4-hydroxyphenyl)-2,2,2-trichloroethane, bis(4-hydroxyphenyl)-(4'-chlorophenyl)methane, 1,1-bis(4-hydroxyphenyl)cyclohexane, bis(4-hydroxyphenyl)cyclohexylmethane, 4,4'-dihydroxydiphenyl, 2,2'-dihydroxydiphenyl, hydroquinone, resorcinol, 2,6-dihydroxytoluene, and 2,6-dihydroxychlorobenzene. The aromatic polyesters are prepared from these aromatic dicarboxylic chlorides and bisphenols by, for instance, an interfacial polycondensation. In that case, the polyesters are obtained in the form of a solution in a halogenated hydrocarbon solvent such as methylene chloride.

The concentration of the solution of a polymer to be isolated according to the present invention is from 1 to 80% by weight. Preferably, the concentration is selected from 5 to 30% by weight, since when the concentration is less than 5% by weight, the amount of the solvent to be distilled away is too large, and when the concentration is more than 30% by weight, the solution becomes viscous and dispersing into the aqueous layer is not easily conducted.

All organic solvents which are substantially immiscible with water and capable of dissolving polymers, can be employed in the present invention. In case of handling two or more kinds of polymers, solvents common to these polymers are employed. Representative solvents are halogenated hydrocarbon solvents such as methylene chloride.

The mixing or dispersion of an organic solvent solution of a polymer and an aqueous solution of a water-soluble polymeric dispersant can be conducted by various methods, e.g. vigorous agitation, mixing using a ultrasonic mixing machine and circulation using a pump. The obtained dispersion is then subjected to distillation for removing the organic solvent with or without heating under ordinary or reduced pressure. The operations may be conducted continuously or batchwise. If necessary, water or hot water may be added to the system during the operation for distilling away the organic solvent. Thus, the polymer is separated as particles or powder from the solution. The particles or powder are recovered in a usual manner such as decantation, filtration or centrifugation and are then dried.

In the above isolation operation, additives such as antioxidants and other stabilizers, dyes and pigments may present in the system.

The feature of the invention that no phenomenon such as adhesion of polymer particles to each other and adhesion of polymer particles and scale to the wall of a vessel is seen in the present invention cannot be guessed from conventional knowledges.

The polymer particles obtained according to the present invention have in general a bulk density of 0.2 to 0.7 g./cm.$^3$, and have a relatively uniform particle size. The water-soluble polymeric dispersant is removed with water, and does not substantially remain in the obtained polymer particles. The aqueous solution obtained after recovering the polymer particles may be reused.

The obtained polymer particles may be incorporated with various additives such as a filler, a pigment, a stabilizer or a mold release agent, or may be blended with a different kind of a polymer, according to conventionally known methods. The particles or the blend may be subjected directly or after pelletization, to a molding processing. Also, in case that the polymer is obtained in the form of a fine powder, it may be used for coating such as powder coating.

The present invention is more specifically described and explained by means of the following Examples in which all % are by weight unless otherwise noted. It is to be understood that the present invention is not limited to the Examples and various changes and modifications may be made in the invention without departing from the spirit and scope thereof.

EXAMPLE 1

In 3 liter flask, 223.7 g. of 2,2-bis(4-hydroxyphenyl)-propane (hereinafter referred to as "bisphenol A"), 125.6 g. of bis(3,5-dimethyl-4-hydroxyphenyl)methane (hereinafter referred to as "TM bisphenol F"), 7.0 g. of p-methoxyphenol, 2.4 g. of sodium thiosulfate, 960 ml. of 4N NaOH and 1,600 ml. of water were admixed under a nitrogen atmosphere. The mixture was cooled to 2° C. to give an aqueous alkali solution of the bisphenol compounds. On the other hand, in another 3 liter flask, 304.5 g. of terephthaloyl chloride was dissolved in 2,500 ml. of methylene chloride under a nitrogen atmosphere, and it was cooled to 2° C.

An 8 liter separable flask was charged with 500 ml. of water, 500 ml. of methylene chloride and 4.67 g. of benzyltributylammonium chloride as a catalyst under a nitrogen atmosphere, and the content was cooled to 2° C. To this flask were continuously added the above two solutions over 800 seconds by a pump with vigorous agitation. To the system was added 8.4 g. of benzoyl chloride dissolved in 100 ml. of methylene chloride 1.5 hours after the completion of the addition. After 20 minutes, the agitation was stopped. The reaction mixture separated into a methylene chloride solution containing the produced polymer and an aqueous solution containing sodium chloride and sodium hydroxide about 10 minutes after stopping the agitation. After removing the aqueous phase, an equal amount of water was added to the organic phase, and was neutralized with a slight amount of hydrochloric acid with agitation. After removing the aqueous phase again, the organic phase, namely the methylene chloride solution of a polymer, was washed with water 5 times to desalt.

To the methylene chloride solution was added 3,000 ml. of a 300 p.p.m. aqueous solutions of polyvinyl alcohol having a degree of hydrolysis of 86.5 to 89% by mole and a degree of polymerization of about 500 (viscosity of 4% aqueous solution: 5.5 cP at 20° C.). With vigorously agitating the two solutions, a jacket of a vessel was heated to 39° C. to adjust the inside temperature to the vicinity of the boiling point of methylene chloride. Methylene chloride was gradually distilled away over about 8 hours in that state. Thereafter, the agitation and heating were stopped, thus causing the polymer particles to deposit in the bottom of the vessel. The polymer particles were filtered off and dried in the air of 80° C. to remove the remaining methylene chloride and water. The amount of the obtained polymer was 540 g. (yield: 98%). The polymer had an inherent viscosity of 0.56 dl./g. (at 32° C. in chloroform) and a bulk density of 0.25 g./cm$^3$.

Also, when the temperature of the jacket was higher than the above temperature, foaming occurred and the distillation could not be conducted.

EXAMPLE 2

In 85 g. of methylene chloride was dissolved 15 g. of a polymer having the same composition as in Example 1. On the other hand, 100 g. of a 0.1% aqueous solution of partial ammonium salt of a styrene-maleic acid copolymer was prepared. Both solutions were admixed with vigorous agitation, and methylene chloride was slowly distilled away at room temperature under reduced pressure, while continuing the agitation. After 1.5 hours, the polymer was separated in the form of granules having a particle size of not more than about 2 mm.

EXAMPLE 3

In 50 g. of methylene chloride was dissolved 5 g. of a polymer having the same composition as in Example 1. On the other hand, 50 g. of a 0.05% aqueous solution of polyvinyl pyrrolidone having a molecular weight of about 40,000 was prepared. Thereafter, both solutions were treated in the same manner as in Example 2 to give polymer particles having a particle size of about 3 mm. and a bulk density of 0.5 g./cm$^3$.

EXAMPLE 4

In 50 g. of methylene chloride was dissolved 5 g. of a commercially available polymer made from bisphenol A and a mixture of terephthalic acid and isophthalic acid (commercial name "U-100" made by UNITIKA Ltd.) The solution was admixed with 50 g. of a 300 p.p.m. aqueous solution of the same polyvinyl alcohol as used in Example 1, and treated in the same manner as in Example 1 to give a dispersion of a partially foamed pearl-like polymer. The pearl-like polymer was isolated by filtration. The bulk density of the polymer was 0.2 g./cm$^3$.

COMPARATIVE EXAMPLE 1

The mixing and distillation were conducted in the same manner as in Example 1 except that polyvinyl alcohol was not employed, namely by admixing 55 g. of the polymer solution with the same amount of water and distilling away methylene chloride. The polymer adhered to the agitator in the form of a viscous gum with the progress of the concentration. It became a large ball-like mass after 1 hour, and also adhered to the inner wall of the flask. No particles were obtained.

EXAMPLE 5

In 8 liter separable flask, 223.15 g. of bisphenol A, 125.12 g. of TM bisphenol F and 8.38 g. of p-methoxyphenol were dissolved in 3,120 ml. of water containing 153.6 g. of sodium hydroxide. To the solution was added 4.68 g. of benzyltributylammonium chloride as a catalyst, and the solution was cooled to 0° C. On the other hand, 274.05 g. of terephthaloyl chloride and 30.45 g. of isophthaloyl chloride were dissolved in 3,000 ml. of methylene chloride, and the solution was cooled to 0° C. The both solutions were admixed with vigorous agitation, and after 1 hour, 0.84 g. of benzoyl chloride was added to the mixture. After agitating for 20 minutes, the agitation was stopped to separate into an organic phase containing the produced polymer and an aqueous phase. After removing the aqueous phase, an equal amount of water was added to the remaining organic phase and was neutralized with a slight amount of hydrochloric acid. This procedure was further repeated 3 times to give a methylene chloride solution of the polymer.

To the obtained solution of the polymer was added an aqueous solution of 0.6 g. of polyvinyl alcohol having a degree of hydrolysis of 99% by mole (viscosity of 4% aqueous solution: 39 cP at 20° C.) dissolved in 3,000 ml. of water. Methylene chloride was distilled away by heating a jacket at a temperature of 40° to 42° C., while agitating the mixture. Although a foaming phenomenon was slightly observed in an early stage of the distillation, pearl-like polymer particles having a particle size of about 1 mm. and dispersed in water were obtained 4 hours later. The polymer particles were filtered off, washed with water twice and dried. The polymer had an intrinsic viscosity [$\eta$] of 0.70 (at 32° C. in chloroform) and a bulk density of 0.69 g./cm$^3$. The yield of the polymer was 98%.

EXAMPLE 6

The procedure of Example 5 was repeated except that a polyvinyl alcohol having a degree of hydrolysis of 86.5 to 89.0% by mole (viscosity of 4% aqueous solution: 43±3 cP at 20° C.) was employed in combination with 0.9 g. of polyethylene oxide having an average molecular weight 150,000 to 400,000 and the jacket was heated at a temperature of 43° to 45° C. to distil away methylene chloride. The foaming phenomenon in an early stage was not observed at all, and pearl-like polymer particles having a particle size of about 1 mm. dispersed in water were obtained 3 hours later. No adhesion of scale to the axis of the agitator was also observed. The yield of the polymer was 99%.

EXAMPLE 7

In a 50 liter polymerization vessel, 1,487.67 g. of bisphenol A, 834.13 g. of TM bisphenol F and 55.87 g. of p-methoxyphenol were dissolved in 20.8 liters of water containing 1,024.67 g. of sodium hydroxide. To the solution was added 31.2 g. of benzyltributylammonium chloride as a catalyst, and the solution was cooled to 5° C. On the other hand, 1,827 g. of terephthaloyl chloride and 203 g. of isophthaloyl chloride were dissolved in 20 liters of methylene chloride, and the solution was cooled to 5° C. The both solutions were admixed with vigorous agitation, and after 1 hour, 5.62 g. of benzoyl chloride was added to the mixture. After agitating the mixture for 20 minutes, the agitation was stopped to separate the mixture into an organic phase containing the produced polymer and an aqueous phase. The aqueous phase was removed, and the organic phase was washed with water 3 times to give a methylene chloride solution of the polymer.

The obtained solution was admixed with an aqueous solution of 4 g. of polyvinyl alcohol having a degree of hydrolysis of 86.5 to 89% by mole (viscosity of 4% aqueous solution: 43±3 cP at 20° C.) and 6 g. of polyethylene oxide having an average molecular weight of 150,000 to 400,000 dissolved in 20 liters of water. A jacket of the vessel was heated at a temperature of 43° to 44° C. to distil away methylene chloride, while agitating the mixture. After 3 hours, 17.6 liters of methylene chloride was distilled away to give the polymer dispersed in water in the form of pearl-like particles having a particle size of 1 mm. The polymer was filtered off, washed with water twice and dried. The obtained polymer had an intrinsic viscosity of 0.65 (at 32° C. in chloroform) and a bulk density of 0.65 g./cm$^3$.

EXAMPLE 8

To a 500 ml. separable flask was added 56 ml. of the methylene chloride solution of the aromatic polyester prepared in the same manner as in Example 5, and it was diluted to 200 ml. with methylene chloride. To the flask was added 10 g. of a commercially available polycarbonate (commercial name "Panlite" made by Teijin Limited) made from bisphenol A and phosgene, and it was dissolved in the solution with agitation. The obtained solution containing two kinds of polymers was homogeneous and transparent.

To the methylene chloride solution was added 200 ml. of a 200 p.p.m. aqueous solution of polyvinyl alcohol having a degree of hydrolysis of 88% by mole (viscosity of 4% aqueous solution: 43 cP at 20° C.). The both solutions were agitated to disperse the methylene chloride solution into the aqueous solution. Methyelne chloride was then gradually distilled away at 45° C., while adding water to the dispersion. At the time when 170 ml. of methyelne chloride was distilled away, the pearl-like particles in the system did not adhere to each other. The particles were filtered off, washed with water and dried. The particle size of the obtained blend was from about 0.1 to about 2 mm.

Some specimens were taken out and the flowability of the particulate blend was measured by employing a Koka type flow tester made by Shimadzu Corporation (cylinder temperature: 320° C., load: 100 kg.cm$^2$.). All specimens showed the same flow value. This fact indicates that two kinds of the polymers are uniformly blended.

The flowability of the blend is shown in Table 1 with that of the polyester and the polycarbonate.

TABLE 1

|  | Flow value (cm.$^3$/sec.) |
| --- | --- |
| Blend | 2.1 × 10$^{-2}$ |
| Polyester | 0.18 × 10$^{-2}$ |
| Polycarbonate | 16.0 × 10$^{-2}$ |

EXAMPLE 9

The procedure of Example 8 was repeated except that a commercially available polysulfone (commercial name "P-1700" made by Union Carbide Corp.) made from bisphenol A and dichlorodiphenyl sulfone was employed instead of the polycarbonate.

The results of the measurement of the flowability are shown in Table 2.

TABLE 2

|  | Flow value (cm.$^3$/sec.) |
| --- | --- |
| Blend | 0.75 × 10$^{-2}$ |
| Polysulfone | 1.5 × 10$^{-2}$ |

EXAMPLE 10

The procedure of Example 8 was repeated except that a commercially available polystyrene was employed instead of the polycarbonate. The obtained particulate blend had a flowability of 45.0×10$^{-2}$ cm$^3$./sec.

In addition to the ingredients used in the Examples, other ingredients can be used in the Examples as set forth in the specification to obtain substantially the same results.

What we claim is:

1. A process for isolating a polymer which consists essentially of the steps of admixing a 1 to 80% by weight solution of a first polymer in an organic solvent which is substantially immiscible with water, with 50 to 10,000 parts of a 0.001 to 1% by weight aqueous solution of a water-soluble polymeric dispersant, and while agitating distilling away said organic solvent from the mixture in the form of a suspension, thereby depositing particles of said first polymer, said parts being parts by weight per 100 parts of the organic solvent solution.

2. The process of claim 1, wherein said water-soluble polymeric dispersant is at least one member selected from the group consisting of carboxymethyl cullulose, hydroxyethyl cellulose, a styrene-maleic acid copolymer and derivatives thereof, polyvinyl alcohol and derivatives thereof, polyvinyl pyrrolidone, polyvinyl pyridine-N-oxide, a polyalkylene oxide and derivatives thereof, sodium alginate and derivatives thereof and lignin sulfonate.

3. The process of claim 1, wherein said water-soluble polymeric dispersant is at least one member selected from the group consisting of polyvinyl pyrrolidone, polyvinyl alcohol and derivatives thereof, and a styrene-maleic acid copolymer and derivatives thereof.

4. The process of claim 1, wherein said water-soluble polymeric dispersant is polyvinyl alcohol.

5. The process of claim 4, wherein said polyvinyl alcohol is a polymer which has a degree of hydrolysis of 60 to 100% by mole and of which the viscosity of a 4% by weight aqueous solution is from 15 to 100 cP at 20° C.

6. The process of claim 2, wherein said water-soluble polymeric dispersant is employed in combination with 0.001 to 1% by weight of a polyalkylene oxide based on the weight of the water used.

7. The process of claim 6, wherein said polyalkylene oxide is a member selected from the group consisting of polyethylene oxide, polypropylene oxide and ethylene oxide-propylene oxide copolymer.

8. The process of claim 1, wherein said first polymer is at least one member selected from the group consisting of aromatic and aliphatic polyesters, polycarbonate, polyestercarbonate, polyamide, polyamidester, polyesterether, polysulfonate, polyphosphonate, polyphosphate, polyaryl sulfone, polyarylene sulfide, polyarylene oxide, polyacetal, and a vinyl polymer.

9. The process of claim 1, wherein said first polymer is at least one member selected from the group consisting of an aromatic polyester, an aromatic polycarbonate and an aromatic polyestercarbonate.

10. The process of claim 1, wherein said first polymer is an aromatic polyester.

11. The process of claim 10, wherein said aromatic polyester is a polymer of the general formula:

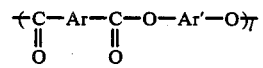

wherein Ar and Ar' are a bivalent group.

12. The process of claim 11, wherein said Ar and Ar' are a bivalent aromatic group of the general formula:

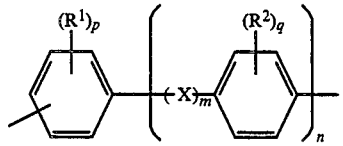

wherein m and n are 0 or an integer of 1 to 2, p and q are 0 or an integer of 1 to 4, R$^1$ and R$^2$ are a C$_1$ to C$_{20}$ alkyl, aryl, aralkyl, alkoxyl, aryloxyl and arylalkoxyl group, a substituted derivative thereof or a halogen atom, and X is a covalent bond, a C$_1$ to C$_{10}$ alkylene group, a C$_5$ to C$_{15}$ cycloalkylene group, a cycloalkylidene group or its derivative, —O—, —S—, —CO— or —SO$_2$—, provided that the substituent groups on the benzene rings can be the same or different and different groups from each other can be attached to different positions on the respective benzene rings.

13. The process of claim 1, wherein said particles of said first polymer have a size of at least 0.1 mm.

14. The process of claim 1, wherein said particles of said first polymer have a size of about 0.1 to about 3 mm.

15. A process for isolating a polymer which consists essentially of the steps of admixing a 1 to 80% by weight solution of a first polymer in an organic solvent which is substantially immisible with water, with 50 to 10,000 parts of a 0.001 to 1% by weight aqueous solution of a water-soluble polymeric dispersant, and while agitating distilling away said organic solvent from the mixture, thereby depositing particles of said first polymer having a property of being molded processed without pellitization, said parts being parts by weight per 100 parts of the organic solvent solution.

16. The process of claim 15, wherein said particles of said first polymer have a size of at least 0.1 mm.

17. The process of claim 15, wherein said particles of said first polymer have a size of about 0.1 to about 3 mm.

* * * * *